Patented July 8, 1947

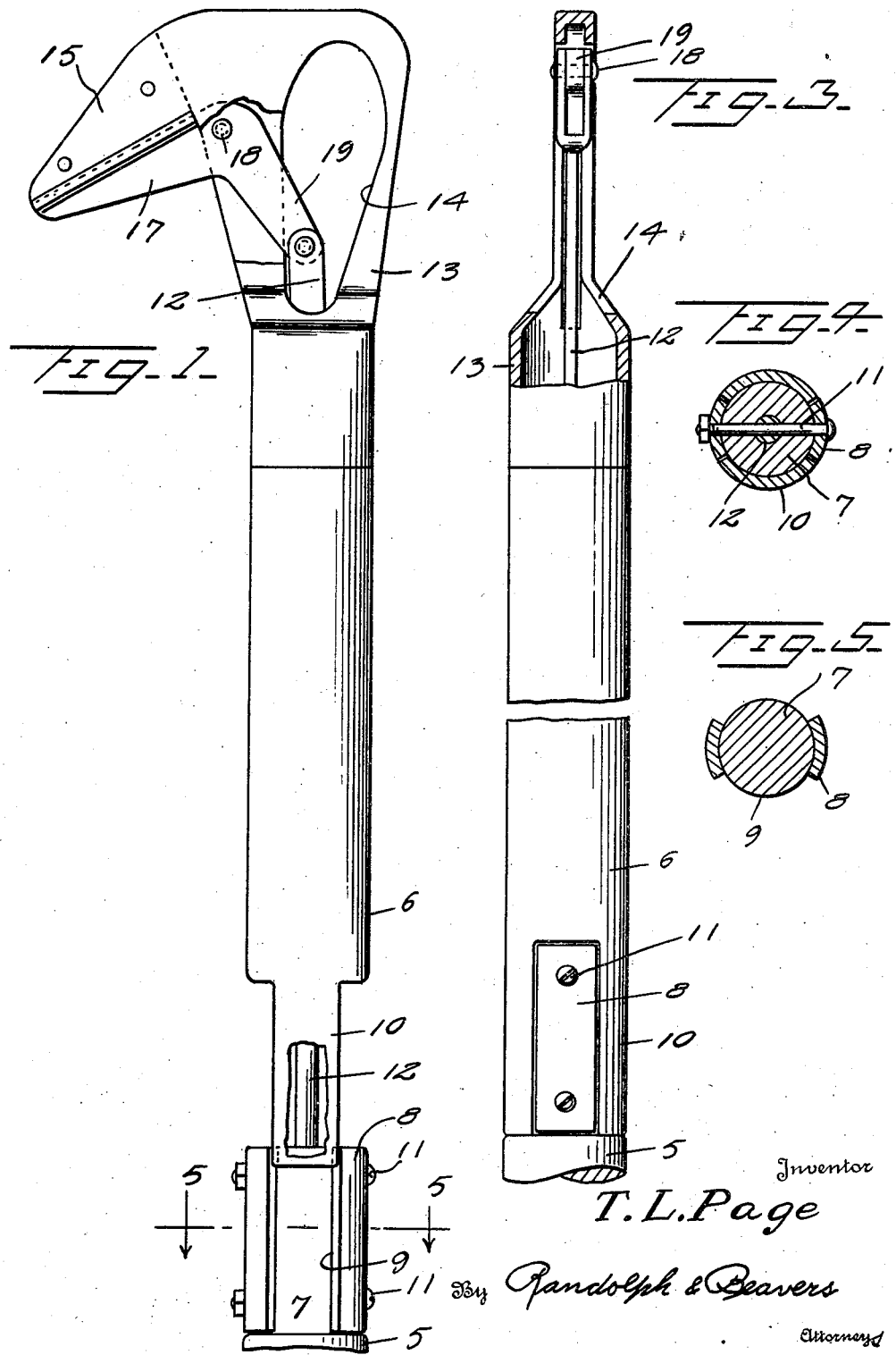

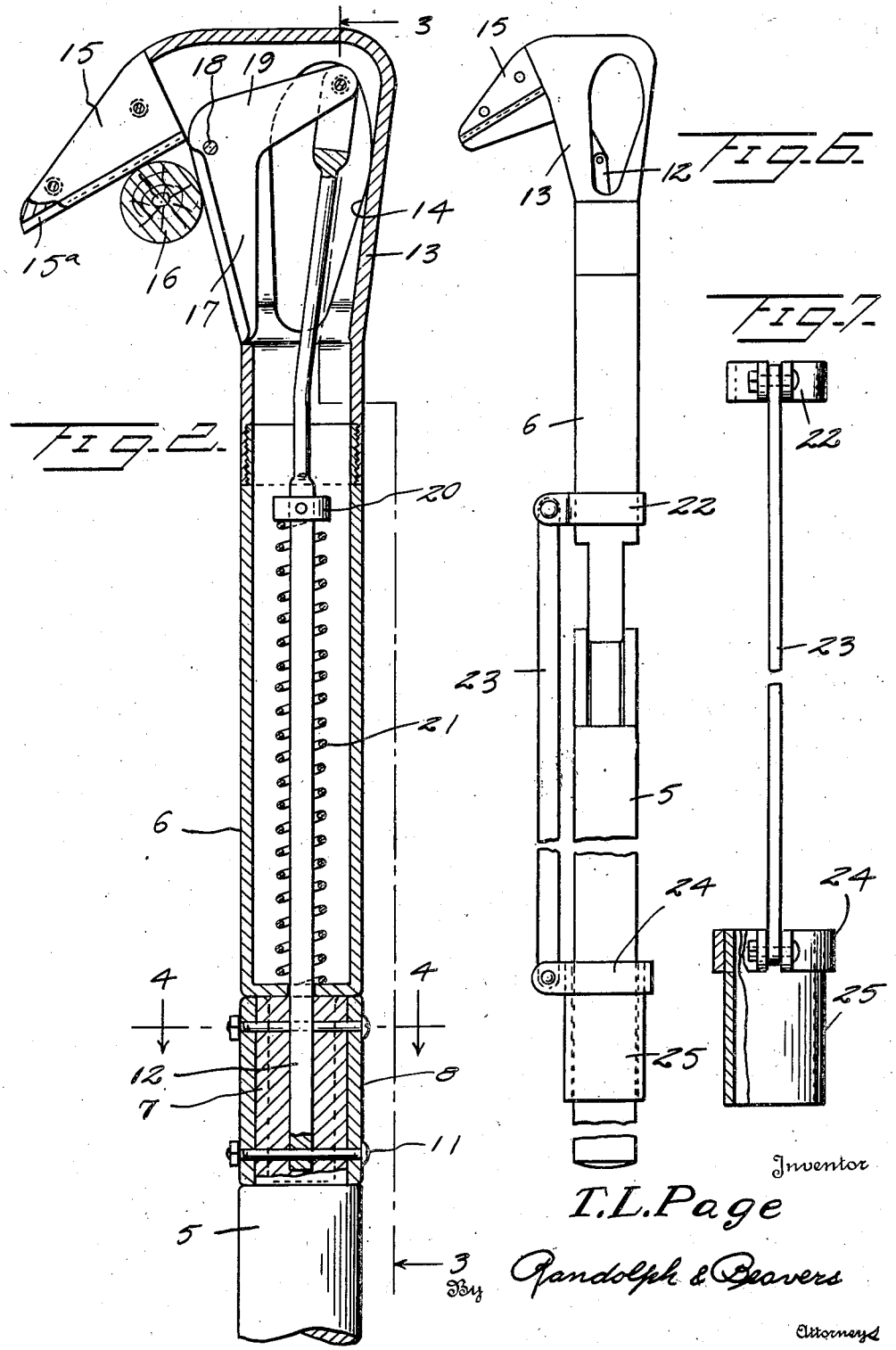

2,423,723

UNITED STATES PATENT OFFICE 2,423,723

PRUNING NIPPERS OF THE PULL OPERATED TYPE

Thomas L. Page, Stamford, Conn.

Application January 31, 1945, Serial No. 575,384

6 Claims. (Cl. 30—190)

The present invention relates to pruning nippers of the pull operated type and to new and useful improvements in pruning cutters of a type adapted for severing overhead branches of tree sprouts, tree suckers and the like and the invention has for its primary object to provide a movable cutter working in cooperation with a stationary strike and operable upon the downward pulling force exerted on the handle of the cutter to move the movable cutter toward the stationary strike.

A further object of invention is to provide a pruning cutter including a substantially hook shaped stationary strike adapted for engaging a limb to be severed and a handle operatively connected with a pivoted blade and operated upon a downward pulling force exerted on the handle whereby one hand of the operator is operating the cutter.

Other objects and advantages reside in the details of construction and operation as more fully hereinafter described and claimed, reference being had to the accompanying drawings forming part hereof, wherein Figure 1 is a side elevational view.

Figure 2 is a longitudinal sectional view through the upper section of the handle.

Figure 3 is a similar view taken substantially on a line 3—3 of Figure 2.

Figure 4 is a transverse sectional view taken substantially on a line 4—4 of Figure 2.

Figure 5 is a similar view taken substantially on a line 5—5 of Figure 1.

Figure 6 is a side elevational view of a modified form of the invention and

Figure 7 is a side elevational view of the blade operating means for the embodiment shown in Figure 6.

Referring now to the drawings in detail and first with respect to the form of the invention illustrated in Figures 1 to 5 inclusive the numeral 5 designates a lower handle section and numeral 6 designates a hollow upper section. The handle section 5 is formed with a reduced upper end 7 to the opposite sides of which are attached longitudinally extending plates 8 to form relatively wide longitudinally extending guide slots 9 between the edges of the respective plates.

The lower end of the upper section 6 is formed with downwardly extending tongues 10 at opposite sides for slidable engagement in the slots 9.

The plates 8 are secured to the reduced extension 7 by means of bolts 11 which also extend transversely through the lower end of the rod 12 set in a recess in the extension 7, the rod extending upwardly through the upper hollow section 6.

To the upper end of the hollow section 6 is threadedly attached a hollow head 13 having openings 14 in its sides as well as in its front edge. At the end of the front opening at the upper portion of the head is attached an outwardly and downwardly directed stationary strike 15 substantially in the form of a hook adapted for engaging over a tree branch or limb 16 as shown more clearly in Figure 2 of the drawings. The bill portion of the hook is straight and formed with a longitudinally extending groove 15a.

A moveable blade 17 is pivoted on a pin 18 carried by the head for movement into and out of the front opening of the head and into and out of cutting operation with the stationary strike 15, the edge of the blade seating when closed in the groove 15a. An inwardly and upwardly inclined extension 19 is formed at the pivoted end of the blade 17 and to the end of which is pivotally attached the upper end of the rod 12.

A collar 20 is secured to the rod 12 and surrounding the rod and positioned between the collar and the bottom of the handle section 6 is a coil spring 21 adapted to yieldably urge the rod 12 upwardly whereby to swing the blade 17 inwardly into the open position shown in Figure 2 of the drawings.

Upon engagement of the stationary strike 15 with the limb 16 of a tree and exerting a downward pulling force on the handle section 5 the upper hollow section 7 and head 13 will be held stationary while the rod 12 will be pulled downwardly whereby to actuate the blade 17 and thus sever the limb, the handle sections 5 and 6 and the blade 17 then occupying the position shown in Figure 1.

By hooking the strike 15 over a limb or sprout of a tree, the cutter may be operated by one hand of a person gripping the handle and exerting a downward pulling force thereon.

Obviously an implement constructed as described offers a pronounced safety factor over other tools of this character. The operator using only one hand for operating the tool, has the other available for catching or warding off falling objects and to hold onto whatever structure he may have to climb on to perform work.

Where it is desired to cut relatively small limbs or branches, or the tips of the same I provide an attachment for holding the upper handle section 6 stationary and which, as illustrated in Figures 6 and 7 of the drawings, comprises a split clamping means 22 secured in clamping engagement with the handle section 6 and to which the upper end of a rod 23 is attached, the lower end of the rod being attached to a clamping ring 24 secured to the upper portion of a sleeve 25 slidably mounted on the lower handle section 5 and serving as a grip for supporting section 6.

It is believed that the details of construction, manner of operation and advantages of the device will be readily understood from the foregoing without further detailed explanation.

While the foregoing specification sets forth the invention in specific terms, it is to be understood that numerous changes in the shape, size and materials may be resorted to without departing from the spirit and scope of the invention as claimed hereinafter.

Having thus described the invention, what I claim is:

1. A cutter of the character described comprising an elongated handle, a rod protruding longitudinally from the handle, a sleeve having an opening in one end through which the rod projects, said rod extending through the tube, a hollow head detachably secured to the outer end of the tube and receiving the adjacent end of the rod, said head having a slot, a bell-crank shaped cutter pivotally secured in the head and provided with a cutting edge along one leg portion thereof, a pivotal connection between the opposite leg portion of the cutter and the adjacent end of the rod, said head being provided with an inclined strike opposed to the cutting edge of the cutter, spring means in the tube engageable with the rod for retaining the blade in retracted position.

2. A cutter of the character described comprising an elongated handle, a rod protruding longitudinally from the handle, a sleeve having an opening in one end through which the rod projects, said rod extending through the tube, a hollow head detachably secured to the outer end of the tube and receiving the adjacent end of the rod, said head having a slot, a bell-crank shaped cutter pivotally secured in the head and provided with a cutting edge along one leg portion thereof, a pivotal connection between the opposite leg portion of the cutter and the adjacent end of the rod, said head being provided with an inclined strike opposed to the cutting edge of the cutter, spring means in the tube engageable with the rod for retaining the blade in retracted position, said strike being provided with an anvil of soft material against which the cutting edge of the cutter can engage after cutting through stock.

3. A cutter of the character described comprising an elongated handle, a rod protruding longitudinally from the handle, a sleeve having an opening in one end through which the rod projects, said rod extending through the tube, a hollow head detachably secured to the outer end of the tube and receiving the adjacent end of the rod, said head having a slot, a bell-crank shaped cutter pivotally secured in the head and provided with a cutting edge along one leg portion thereof, a pivotal connection between the opposite leg portion of the cutter and the adjacent end of the rod, said head being provided with an inclined strike opposed to the cutting edge of the cutter, spring means in the tube engageable with the rod for retaining the blade in retracted position, said strike being provided with an anvil or soft material against which the cutting edge of the cutter can engage after cutting through stock, said anvil being of soft metal.

4. A cutter of the character described comprising an elongated handle, a rod protruding longitudinally from the handle, a sleeve having an opening in one end through which the rod projects, said rod extending through the tube, a hollow head detachably secured to the outer end of the tube and receiving the adjacent end of the rod, said head having a slot, a bell-crank shaped cutter pivotally secured in the head and provided with a cutting edge along one leg portion thereof, a pivotal connection between the opposite leg portion of the cutter and the adjacent end of the rod, said head being provided with an inclined strike opposed to the cutting edge of the cutter, spring means in the tube engageable with the rod for retaining the blade in retracted position, said head having a substantially large opening in the side thereof to permit access to said rod and pivotal connection.

5. A cutter of the character described comprising an elongated handle, a rod protruding longitudinally from the handle, a sleeve having an opening in one end through which the rod projects, said rod extending through the tube, a hollow head detachably secured to the outer end of the tube and receiving the adjacent end of the rod, said head having a slot, a bell-crank shaped cutter pivotally secured in the head and provided with a cutting edge along one leg portion thereof, a pivotal connection between the opposite leg portion of the cutter and the adjacent end of the rod, said head being provided with an inclined strike opposed to the cutting edge of the cutter, spring means in the tube engageable with the rod for retaining the blade in retracted position, a slide sleeve on the handle, a collar on the tube and a link connection between the sleeve and the collar.

6. A cutter of the character described comprising an elongated handle, a rod protruding longitudinally from the handle, a sleeve having an opening in one end through which the rod projects, said rod extending through the tube, a hollow head detachably secured to the outer end of the tube and receiving the adjacent end of the rod, said head having a slot, a bell-crank shaped cutter pivotally secured in the head and provided with a cutting edge along one leg portion thereof, a pivotal connection between the opposite leg portion of the cutter and the adjacent end of the rod, said head being provided with an inclined strike opposed to the cutting edge of the cutter, spring means in the tube engageable with the rod for retaining the blade in retracted position, a slide sleeve on the handle, a collar on the tube and a link connection between the sleeve and the collar, said means for clamping the slide collar positively to the said handle to prevent sliding action between the tube and rod.

THOMAS L. PAGE.

REFERENCES CITED

The following references are of record in the file of this patent:

UNITED STATES PATENTS

| Number | Name | Date |
| --- | --- | --- |
| 2,376,002 | Page | May 15, 1945 |
| 197,415 | Shaw | Nov. 20, 1877 |
| 190,267 | Bevans | May 1, 1877 |